(12) United States Patent
Weissman (10) Patent No.: US 8,570,656 B1
(45) Date of Patent: Oct. 29, 2013

(54) SEE-THROUGH OPTICAL SYSTEM

(76) Inventor: Paul Weissman, Brewster, NY (US)

( * ) Notice: Subject to any disclaimer, the term of this patent is extended or adjusted under 35 U.S.C. 154(b) by 674 days.

(21) Appl. No.: 12/753,899

(22) Filed: Apr. 4, 2010

Related U.S. Application Data (60) Provisional application No. 61/212,015, filed on Apr. 6, 2009.

(51) Int. Cl.
*G02B 27/14* (2006.01)
(52) U.S. Cl.
USPC ............ 359/631; 359/633; 359/634; 359/638
(58) Field of Classification Search
USPC ................. 359/629, 630, 631, 633, 634, 638; 345/7–9; 353/28
See application file for complete search history.

(56) References Cited

U.S. PATENT DOCUMENTS

| | | | |
|---|---|---|---|
| 5,348,477 A | 9/1994 | Welch et al. ................... 434/42 |
| 5,596,451 A | 1/1997 | Handschy et al. ............ 359/633 |
| 5,646,783 A * | 7/1997 | Banbury ........................ 359/630 |
| 5,984,477 A | 11/1999 | Weissman et al. .............. 353/28 |
| 6,853,491 B1 | 2/2005 | Ruhle et al. .................... 359/630 |
| 7,397,607 B2 * | 7/2008 | Travers .......................... 359/630 |
| 7,675,684 B1 | 3/2010 | Weissman et al. ............ 359/639 |

FOREIGN PATENT DOCUMENTS

| | | | | |
|---|---|---|---|---|
| EP | 1 335 231 | 8/2003 | ............. | G02B 23/08 |
| EP | 1 467 237 | 7/2008 | ............. | G02B 23/08 |

* cited by examiner

*Primary Examiner* — Frank Font
(74) *Attorney, Agent, or Firm* — Gerow D Brill (57) ABSTRACT

The embodiments herein describe how if a narrow wave length notch of light is used to illuminate or create an image source then the beam-splitter is only required to transmit over the narrow wavelength notch. If the concave mirror only reflects the same wavelength notch then all other wavelengths will pass through the mirror and be reflected by the beam-splitter. Each of the embodiments uses a method of optical design wherein certain portions or elements of the optical system are used for multiple purposes and/or transmit certain paths of light transmission in multiple directions. This use of multiple purposes and multiple paths produces embodiments of the invention that are smaller and more robust.

20 Claims, 6 Drawing Sheets

PRIOR ART

FIG. 3

PRIOR ART

SEE-THROUGH OPTICAL SYSTEM

CROSS REFERENCE

This application is related to provisional application Ser. No. 61/212,015 filed on Apr. 4, 2009 entitled "A See-Through Optical System and is hereby incorporated herein by reference.

GOVERNMENT SUPPORT

Funds for the development of this disclosure were provided under Contract number W91 CRB-08-C-0110 from US Army RDECOM Simulation and Technology Training Center, 12423 Research Parkway. Orlando, Fla. 32826-3274

FIELD OF THE INVENTION

The Field of Invention is a see through optical systems in particular, a see through optical system with a specialized beam-splitter or a non-conformal concave reflector or both.

BACKGROUND OF THE INVENTION

For many years the applicant has been building optics composed of a beam-splitter cube and a concave reflecting surface. These devices have evolved starting with non-polarized versions through polarized versions. The devices have been used with see through to the outside world as well as immersive only displays.

Beam-splitting cubes and polarizing beam-splitting cubes have been the center point for several optical patents. These partially reflective devices allow two optical paths to be viewed at the same time. The cube has six surfaces, four of which can be used optically, and if one of these is used for viewing, the remaining three can be used for other optical purposes. Physical optics can represent a geometrical shape, however, they deviate light through a different process. It is not necessary for the physical optic to conform to the surface shape of the equivalent geometric optic. When not conforming to the geometric surface shape, they are termed non-conformal. Certain geometric optics, such as Fresnel lenses, can be considered non-conformal shapes.

Figure 1:
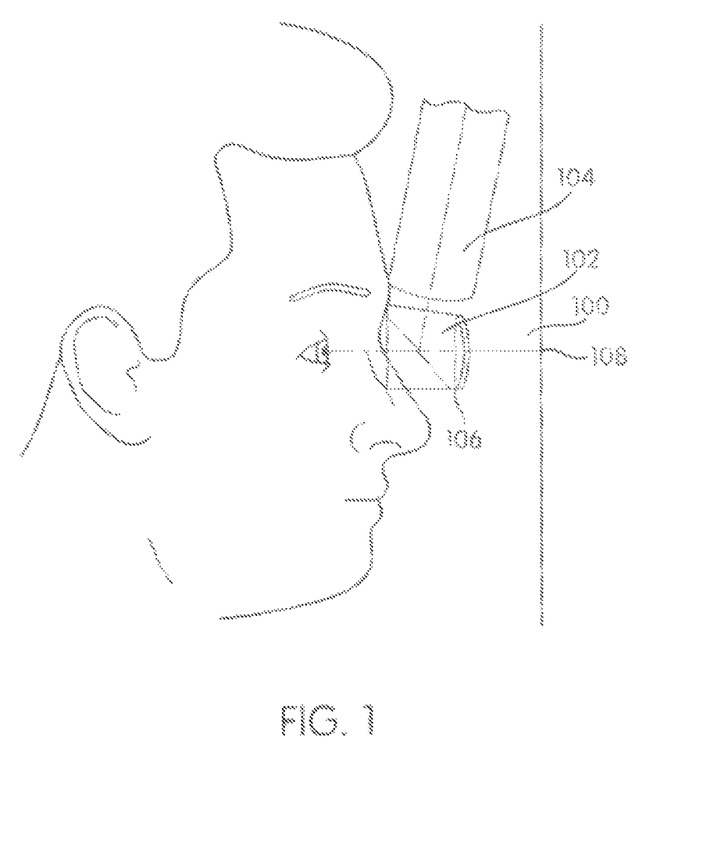
FIG. 1 illustrates an application of a prior art beam-splitter.

FIG. 1 illustrates an early device 100 using a cube 102. In this case the eye looks at one surface of the cube. On the upper surface a CRT 104 is placed. The cube 102 reflects the light emitted by the CRT 104 towards the front of the cube. The light is collimated by the curved concave mirror 106. The curved concave mirror was partially reflective and the collimated image of the CRT was viewed overlaid upon the direct view of the outside world 108.

Dielectric beam-splitter coatings can be polarizing when the incident light is not at 0° to the incident ray. This can, be taken advantage of in the following way. If the beam-splitter surface is a 50/50 beam-splitter (transmits 50% and, reflects 50%), then the product of one transmission and one reflection, to throughput, is 25%. If the same surface is highly polarized and transmits 100% of p polarized light and reflects 100% of s polarized light then for randomly polarized light the surface will reflect all of the s light (50% of the total light). If the s polarized light can be converted to p polarized light and the p polarized light can be made to encounter the same surface, then all the p polarized light will be passed. This yields a 100% increase in the reflection/transmission product, as the throughput increases from 25% to 50%.

A full use of the above concepts was disclosed in U.S. Pat. No. 5,596,451 and illustrated in FIG. 2 of U.S. Pat. No. 5,596,451 is hereby incorporated herein in full.

Figure 2:
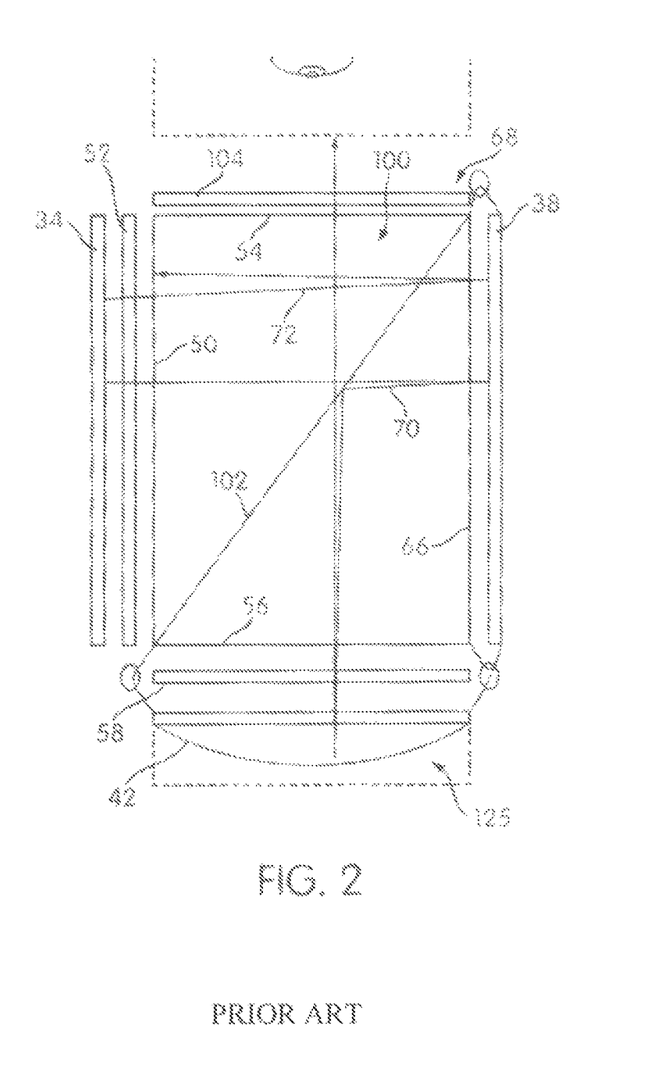
FIG. 2 illustrates a prior art beam-splitter.

The device illustrated in FIG. 2 herein has been used in many applications. When used within a see through optical system, the original 1990 form has some advantages in that with the concave mirror on the front surface, the size of the concave mirror remains unchanged if some of the cube surfaces are tapered. This is an advantage when the sides of the cube going towards the eye are tapered down, causing the sides of the cube to obstruct less of the outside world view. These devices are not limited to single eye eyepieces. They can be adapted to binocular eyepieces also having see-through applications.

Certain applications employ optical systems that directly view the world. For various reasons, it is desirable to insert a synthetic image into the optical system without markedly changing the view of the outside world. The inserted image can be viewed alone or present information, such as an overlay, that is viewed superimposed over the real world view. This application describes a method of introducing an image having a narrow spectral notch into an optical system that generally views the outside world. The notch can be several notches if a synthetic color image is desired. The main area of Interest, with regard to this disclosure, is in the field of zero power periscopes, but the technology herein described can be used effectively in other applications where the optical power is not equal to zero.

Periscopes used in armored vehicles are simple optical systems. Two parallel mirrors, separated by a distance, cause an offset in one direction of the optical axis. The mirrors form a rhomboid that generally displaces the axis without affecting the image orientation or causing angular deviation with respect to the general line of sight direction. In armored vehicles, this is done to displace the viewer from the entrance window location, protecting the viewer from projectiles aimed at the viewing location. The size and separation of the mirrors form two apertures in space. If the apertures of the mirrors remain constant, and if the distance between the mirrors is increased, then the angle of view will decrease. It is desirable to fill the space between the two mirrors with a transparent medium such as plastic. While increasing protection, the optical medium also optically decreases the distance between the two mirrors by the optical thickness described by $$D=t/n$$

In the above, D is the perceived distance, t is the actual distance and n is the index of refraction of a transparent medium.

When a material like plastic is used, an entrance window is located before the upper fold mirror, an exit window is located near the lower fold mirror, and the two windows combined with the two mirrors form a series of apertures which, when rearranged, can be made into a tunnel diagram used for evaluating the view angles through the periscope.

The periscope thus made is generally a low cost, rugged optical assembly with no moving parts. However, as technology progresses, it is desirable to include additional information in the periscope. The addition of information makes the periscope an enhanced periscope. The information may be alphanumeric, pictures or video. The information may be a single, "stand alone" image or comprised of multiple overlays. In most cases, it is desirable to cause the image to be collimated. When the information is overlay information, it is necessary to present the information as a collimated or close to collimated image to relieve eye strain, parallax and allow the various images to be fused by the eyes. For visual sensor information, it is desirable to collimate the image so that visual cues retain the same angularity as those viewed through the non-enhanced periscope.

Within the prior art are several methods of introducing an image into a periscope. European Patent 1 335 231 A1 (2003) ('231) details a method of introducing a collimated image into a periscope using a beam-splitter. The '231 patent is hereby incorporated herein by reference. The '231 patent shows the collimated image can be introduced in several places along the optical path. The periscope transfers an external image (21) to a viewing aperture (20.2), whereby the external image beam (19) is superimposed with a beam (18) with additional visual information (22) at the viewing opening. The additional information is generated by a character-generating image computer (24) on an electro-optical display (29). Another patent, EP 1 467 237 B1 (2004) ('237), depicts a more complex method of reducing the required armor void and superimposing images by using the periscope in combination with a fiber optic image guide, color multiplexing prisms imaging and collimating optics with video and sensors. Periscope for an armored vehicle, having a purely optical channel for transmitting an image, a periscope head being supported such that it can rotate as often as desired about its vertical axis, the optical channel having an image conductor with optical fibers, and a derotation prism being provided for image rotation, characterized in that the derotation prism (31) is designed as a Schmidt-Pechan prism and is arranged upstream of the object-side end of the image conductor These devices present the viewer with a collimated image. These inventions do not make full use of the area inside an existing periscope to collimate the image.

As will be described below, the new disclosure preserves the collimated aspect while simplifying the method of collimation and lessening the required footprint. U.S. Pat. No. 5,348,477 ('477) (1994) and U.S. Pat. No. 6,853,491 ('491) (2005), both hereby incorporated herein by reference, disclose methods of conserving space by using the same space multiple times. In each of these patents a concave reflecting element is used to collimate an object and in each of these patents a portion of the space is used by the light coming from the object to the collimator and used again by the light coming from the mirror to the viewer. In the two patents mentioned, there is no combining of the collimated image with an outside Image. U.S. Pat. No. 5,984,477 ('477), hereby incorporated by reference, illustrates how a collimating lenses and mirrors are combined with a cube beam-splitter to form a one piece optical assembly. In the '477 patent, a similar arrangement illustrates the possibility of combining an outside image with the collimated image. An image is formed on a rear projection screen 17 which travels in the direction of a beam-splitter 13 and is reflected towards a curved beam-splitter 19 which both collimates and reflects a portion of the light back towards beam-splitter 13 and passing through beam splitter 13 the collimated image is viewed by the eye 12. In this patent both 13 and 19 are partially reflective. The efficiency of the system is limited by the reflectance of the beam-splitter 13 times the reflectance of the curved mirror 19 times the transmission of beam splitter 13. The curved mirror 19 when made partially reflective implies that the curved mirror 19 will also be partially transparent and that some light will exit the curved mirror 19 towards the outside world. This light could be observed when looking towards the eyepiece from the outside. Because the curved mirror 19 is partially reflective, light traveling towards the curved mirror 19 from the outside world will be partially reflected by the curved mirror 19 back towards the outside world. Light reflected back towards the outside world by the curved mirror 19 would be a beacon revealing the location of the device.

Figure 3:
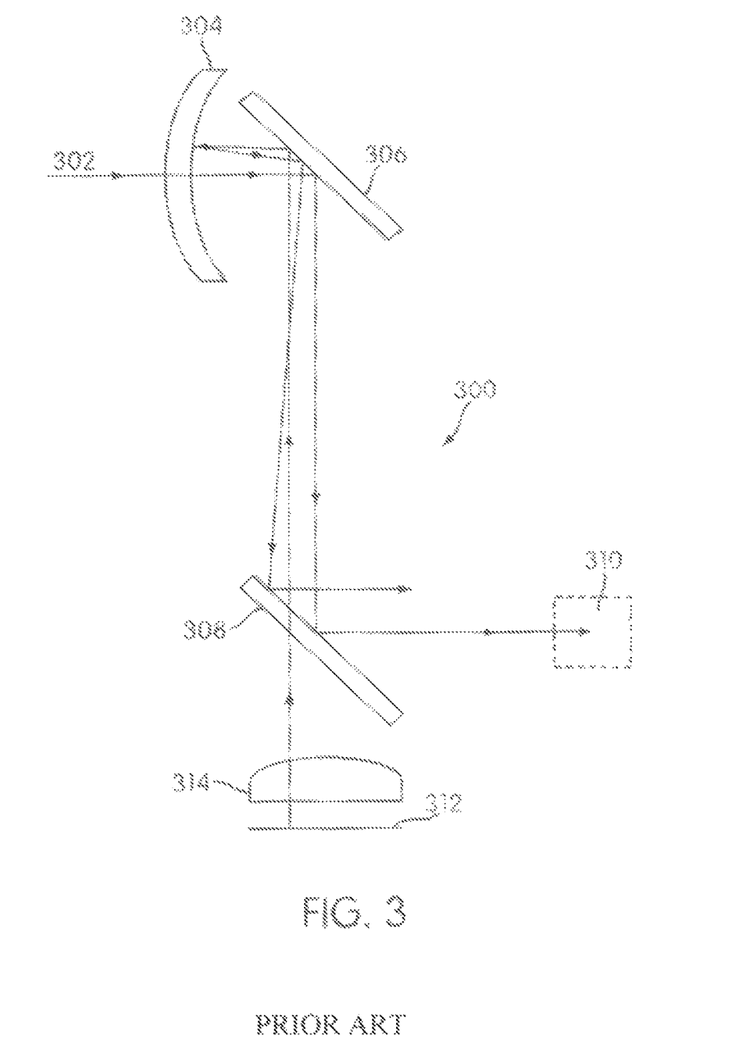
FIG. 3 illustrates a prior art periscope.

FIG. 3 illustrates a typical prior art device 300. In this figure, light from the outside world 302 enters the optical assembly by passing through a partially transparent partially reflecting the curved beam-splitter 304. The light continues to a first mirror 306 and is reflected towards a flat surface beam-splitter 308. A portion of the light is reflected, by the flat surface beam-splitter 308 and is observed by the eye 310 where it is observed as the outside world. In a second path light travels from the source 312 and passes through the optic light 314 and continues towards the flat beam-splitter 308. A portion of the light from the source 312 passes through the flat beam-splitter 308 and continues towards the mirror 306. The source light is reflected from the mirror 306 towards the curved beam-splitter 304. The curved beam-splitter 304 collimates a portion of the source light and returns the source light towards mirror 306 which reflects the light towards the beam-splitter 308. A portion of the light is reflected towards the eye 310 where it is observed as a collimated image. Prior art device 300 suffers from (1), the curved beam-splitter 304 requires a relatively large volume, and (2) the system is inefficient in light management.

BRIEF DESCRIPTION OF THE DRAWINGS

These and other features, aspects, and advantages of the present invention will become better understood with regard to the following description, appended claims, and accompanying drawings where:

SUMMARY OF THE INVENTION

The disclosure describes how if a narrow wave length notch of light is used for an image source then a beam-splitter is only required to work over the narrow wavelength notch while remaining reflective over the remainder of the spectrum. If the concave mirror only reflects the same narrow notch wavelength complementary to the beam-splitter, then all other wavelengths will pass through both the mirror and the beam-splitter.

Figure 4:
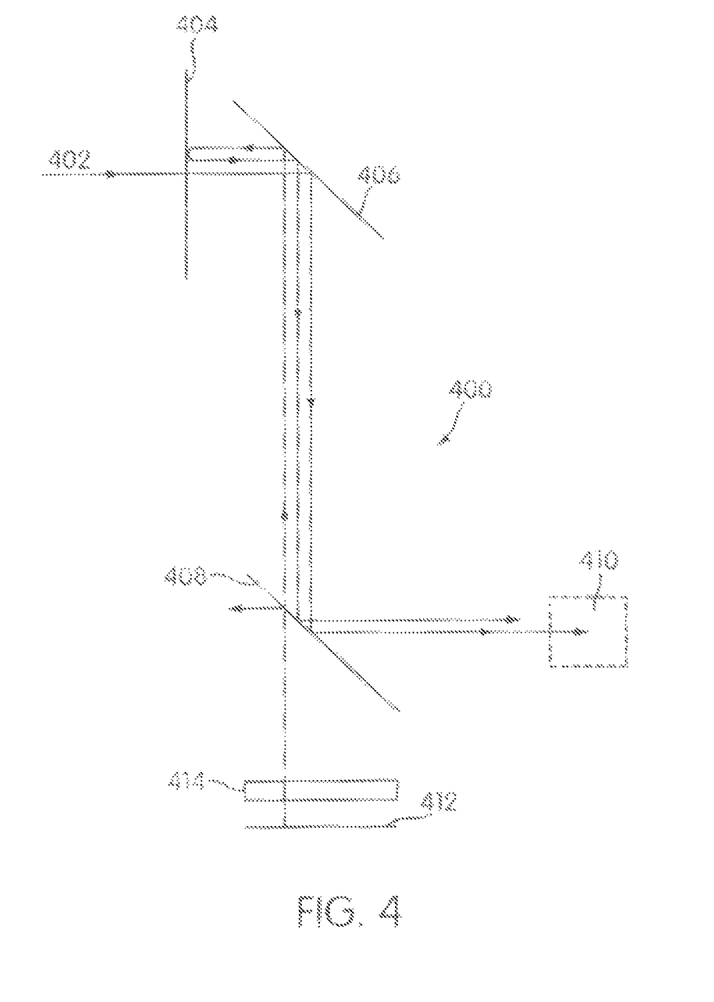
FIG. 4 illustrates a notch beam-splitter, non-conformal mirror without polarization light preservation.

A first embodiment of the invention is a see through optical system having a fold mirror and a beam-splitter to view an outside world. The beam-splitter introduces light which becomes collimated by a non-conformal concave mirror forming a collimated virtual image with both the outside light and the collimated virtual image being observed by an observer's eye(s) individually or simultaneously. FIG. 4 illustrates the first embodiment of an optical system having a mirror a notch beam-splitter, a non-conformal concave mirror and a source.

Figure 5:
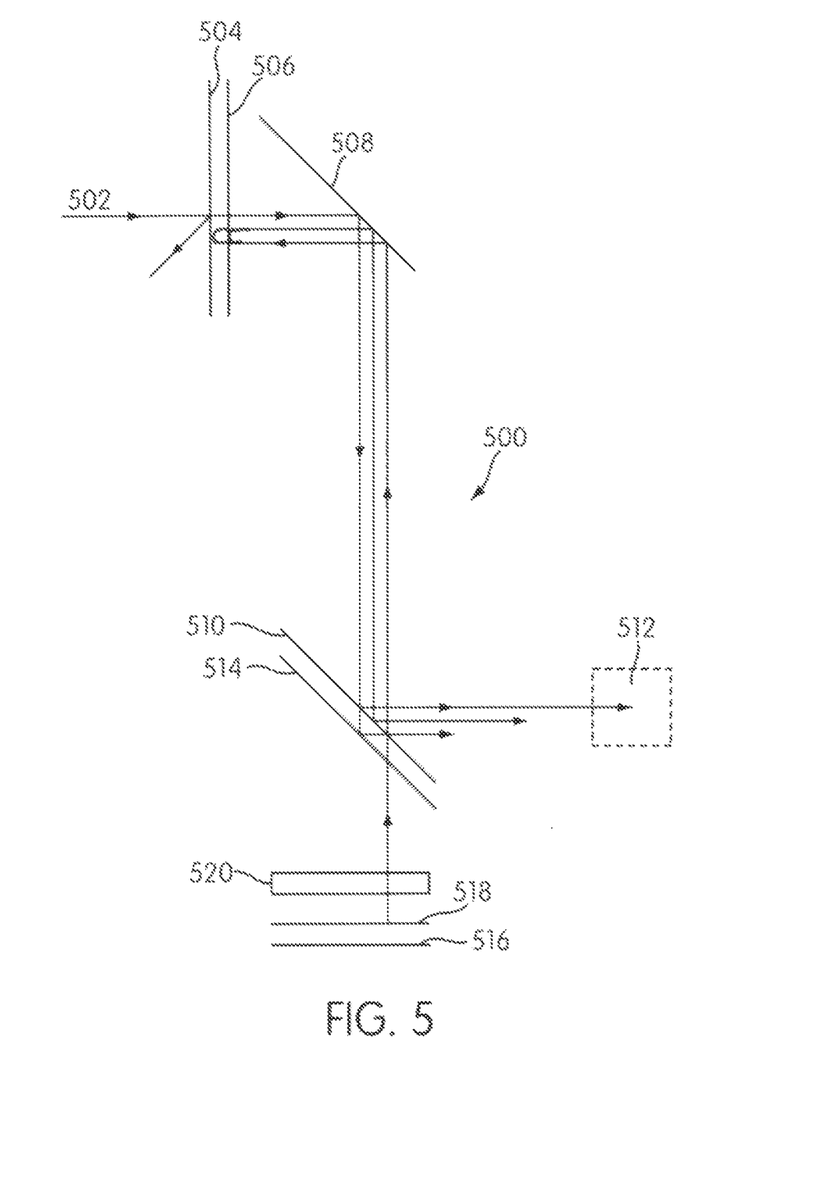
FIG. 5 illustrates a broad band beam-splitter with a non-conformal mirror using polarization light preservation and a non-polarized source.

A second embodiment of the invention is a see-through optical system having a mirror and abeam-splitter to form a rhomboid prism with said rhomboid prism allowing a view of an outside world. The beam-splitter enables a virtual image to be formed within the rhomboid prism, where the virtual image is collimated by a non-conformal concave mirror. FIG.

5 illustrates an optical system having a mirror, a beam-splitter consisting of a wide band metallic or dielectric coating combined with a trans-reflective polarizer, a non-conformal concave mirror, a non-polarized source and a narrow wavelength source.

Figure 6:
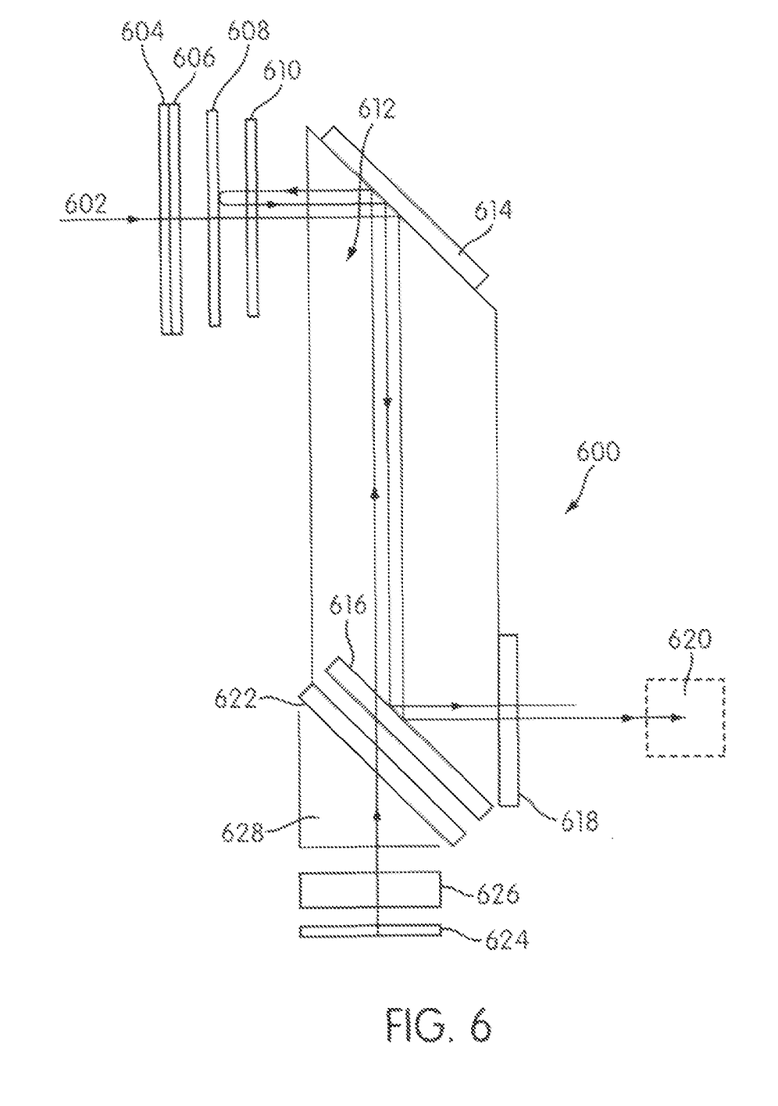
FIG. 6 illustrates the use of a polarized source with filtration to reduce beacon reflection to the outside world.

A third embodiment of the invention is an optical system including a mirror, beam-splitter, a non-conformal concave mirror; and an image source wherein the mirror and the beam-splitter form a rhomboid reflector. The rhomboid reflector is used to view the outside world and the beam-splitter allows the introduction of light from an image source into said rhomboid prism. The rhomboid prism and the non-conformal concave mirror collimates the image source light to become a collimated image source making both the outside world and collimated image source visible to an observer's eye(s). The arrangement also contains methods of increasing the virtual image transmission and methods of decreasing the visibility of the device from the outside world. FIG. 6 illustrates an optical system having of a mirror, a beam splitter consisting of a transmissive notch dielectric filter in, combination with a trans-reflective polarizer, one or more 14 wave retarders, a non-conformal reflector, a polarized source, and one or more absorbing filters.

Each of these embodiments use a method of optical design wherein certain portions or elements of the optical system are used for multiple purposes and/or transmit certain paths of light transmission in multiple directions. This use of multiple purposes and multiple paths produces embodiments of the invention that are smaller and more robust.

DESCRIPTION OF THE INVENTION

The current invention is an optical assembly which has two optical paths which may be used independently or combined. The first optical path directs light from the outside world through an optical medium within which a reflective notch non conformal concave reflector, a mirror and a beam splitter are placed forming a rhomboid and in which additional optical elements may be placed such as filters and wave plates. The light from the outside world is viewed by an observer through the rhomboid. The second optical path uses a narrow spectral width and part, or the entire same rhomboid in combination with some, or all of the optical elements and an image source to form a collimated or near collimated image. The collimated or near collimated image is directed from a focal plane within the optical assembly towards a collimating surface within the optical assembly after which the collimated image is directed towards the observer. The two paths combine a narrow band(s) non-conformal collimating reflecting diffractive mirror optic with a beam-splitter to form an optical assembly with see-through capability. In this invention the non-conformal optic reflects light in a narrow spectral notch and transmits light outside the reflection notch. Thus, both optical paths share both the beam-splitter and the non-conformal concave reflecting optical element, by transmission or reflection, causing multiple paths. The use of the new arrangement causes the invention to be small, robust and manufacturable.

The new invention solves many problems of the prior art. By selectively using both spectrum or polarization or both along with physical optical elements, reflective holographic elements, or other non-conformal reflecting optics, the device can be made compact, rugged and efficient with regard to light. The resulting, potentially monolithic, optical assembly optic can have a high degree of resolution for both the outside world as well as the image collimated by the device. This method of construction is superior for use in hostile environments, and is also a generally good method which insures a long service life. The use of polarization is desirable for the collimated light because it yields the potential of having a theoretical efficiency of 100% when starting with a polarized source such as an LCD. However, the invention does not require polarization to work. Thus, the preferred embodiment will be explained with polarization and other examples will be described with partial and no polarization. It should also be understood that when indicating a transparent medium, the index of refraction (Nd) of the transparent media will be: $1 \leq Nd \geq 1.85$ Object planes can be constructed using polarized light, as is common in liquid crystal displays (LCDs). An image formed from polarized light will remain polarized unless diffused. The light can, be pseudo-depolarized by ¼ wave retarders or Lyot scramblers and other devices well known to those familiar with polarized light. Light can be incident on a trans-reflective polarizer, pass through a trans-reflective polarizer being previously polarized, or become linearly polarized. Passing through the trans-reflective polarizer the light then has an axis of polarization. The linearly polarized light can then be caused to pass through a ¼ wave plate whose axis, fast or slow, is rotated 45 degrees to the linear polarization axis, after which the light is circularly polarized. The circularly polarized light can then be reflected by a mirror or beam-splitter and can be caused to pass through the ¼ wave retarder again in the opposite direction, after which the light will again be linearly polarized. When this linearly polarized light is again incident on the trans-reflective polarizer, the light will be reflected due to the 90° change in the polarization axis. In a similar way, light passing through a trans-reflective polarizer has an axis of polarization. If the polarized light is incident on a reflective mirror and directed back towards the same trans-reflective polarizer the polarized light will pass through the trans-reflective polarizer. The techniques are referred to as methods of light preservation by polarization. There are many combinations of this method of light preservation. An example can be found in U.S. Pat. No. 6,853,491 ('491) (2005), hereby incorporated herein by reference.

Circularly polarized light can be used with cholestreic liquid crystal surfaces to preserve light by making the reflectivity or transmissivity of the liquid crystal surface dependent on the direction of circular rotation, clockwise or counter clockwise. All of these methods are understood by a person versed in the art of polarized light. Additionally, multiples of ¼ wave retarders, which cause a 90 degree rotation of the linear polarization axis after passing through the retarder twice with a reflection between the passes, will accomplish the same task. All these light preservation methods may be freely interchanged in the following descriptions without altering the optical concept of the descriptions. When talking about theoretical efficiency, if a polarized source is used, the then disclosed device can potentially have one hundred percent efficiency for the collimated image.

Reflective notch holograms can be constructed with spherical reflective power on flat or curved surfaces. When a spherical hologram is constructed on, flat surfaces it can be bonded between two flat surfaces. This method of construction can lead to a minimum thickness design. Typical reflective holograms are currently used in laser eye protection. The efficiency of reflection at the design wavelength can exceed 99.99%. These types of holograms are currently manufactured by Gentex in Millwood, N.Y. Although these holographic notch reflectors are manufactured to reflect at 1.06 mu there is a harmonic at 0.53 mu. While the 1.06 mu, reflection can stop laser light from entering the system, the 0.53 mu reflection is useful for the invention as a wavelength to be collimated by the concave reflective element. The notch holographic reflectors reflect from both sides. In one direction of the current disclosed device, the holographic reflector is concave and is used to collimate or reflect the light towards the eye. From the outside the hologram is convex. As light enters from the outside world, a portion will be reflected by the hologram becoming a beacon. This beacon can then be observed from the outside world revealing the position of the device. The holographic reflector only reflects over a narrow wavelength range. There are absorbing filters that absorb light within a narrow wavelength range. An absorbing filter with its absorbing spectral notch is matched to the reflective wavelength notch of the hologram and used between the reflector and the outside world. The matching causes light from the outside world to be absorbed before it is incident on the notch reflective hologram. An interesting example of this concept was used in a different way during WWII. Didymium glass has sharp wavelength absorption bands. Low pressure sodium lamps have a narrow spectral output at approximately 0.589 mu. One of the absorption bands of didymium glass matches the output of low pressure sodium light. The combination of didymium glass windows and sodium lighting enabled factories to continue work at night while appearing dark from the outside. Organic dyes such as chlorophyll suspended in acetone also have narrow wavelength absorption bands. These can be used to accomplish the same task. As an example, in the disclosed device low pressure sodium would be a spectrally good selection to backlight an image source, such as an LCD. The 0.589 mu wavelength would be the reflective wavelength of the non conformal concave reflector and didymium glass would be placed between the non-conformal concave reflector and the outside world. There are many similar choices such as P54 phosphors as illuminators and organic dyes as absorbers.

An interference filter is an optical filter that reflects one or more spectral wave lengths or lines and transmits one or more wave lengths or lines, while maintaining a nearly zero coefficient of absorption for all wavelengths within a range. The filters can be constructed to transmit a wide band of wavelengths or a narrow wavelength notch, and to reflect the proportionate remaining visible light. An interference filter can be constructed to look like an aluminized surface when observing visible light reflecting from the filter. The same filter when viewed by transmission will give a polychromatic or almost monochromatic view dependent on the construction of the dielectric coating layers. The filter can be made transparent for any wavelength such as the sodium wavelength of 0.589 mu, while reflecting all other wavelengths. The wavelength of peak transmission changes as the angle of incidence varies. The filter is constructed to pass the desired wavelength over the anticipated variation of angular use. Additionally, the transmission notch can be a beam-splitter notch. The beam-splitter notch transmits a portion of the light within the wavelength notch and reflects a portion of the light within the wavelength notch. For the disclosed device, it is generally desirable to make the transmission notch narrow and to match the transmission notch of the interference filter to the reflectance notch of the non-conformal concave reflector. However, in some instances, the beam-splitter transmission and reflection remains uniform across the spectrum and are similar to a metallic coating such as chromium or aluminum.

The optical F number can be described as the effective focal length divided by the aperture. This can be described as:

$$F\# = \tfrac{1}{2} N.A.$$

N.A. (numerical aperture)=sin u', where u' is the angle of the marginal ray at the image surface.

As the N.A. increases, the angle u' increases. With regard to the current disclosed device, working at a large N.A. implies that: (1) the required transmission notch of an interference filter will broaden; (2) the reflection notch of the non-conformal concave reflector will broaden; (3) the optical correction of aberrations will become more difficult. Because of these three considerations, it is desirable to move the collimating reflective hologram as far away from the image source as possible. With regard to (1), it is desirable to keep the N.A. low when a narrow notch width is desired. With regard to (2), it is desirable to keep the N.A. low to maximize the efficiency of the reflective hologram. With regard to (3), the reduction of N.A. allows the concave reflector to be flat or non-conformal while still aberrationaly correctable. If the concave reflector is flat this contributes to reducing the complexity of manufacture. It is a benefit to make the concave reflecting element close to the entrance aperture of the periscope. The entrance aperture of the periscope has a location in space. Keeping the concave reflecting element and entrance aperture longitudinally together minimizes the parallax between the two.

The entrance aperture is generally rectangular. A rectangular aperture can have a varying N.A. Starting at the center of the rectangle, the distance to the perimeter of the rectangle changes, with the corners being the most distant points. The N.A. becomes larger for the most distant points. It is desirable to keep the N.A. below 0.333. The invention is a two eyed device.

While not optically corrected to the level of a Head Up Display, there are similarities in the importance of aberrational correction. This means that improper collimation of the monochromatic aberrations, such as spherical aberration; astigmatism; and Petzval curvature have the potential to cause a vergence error. Although the eye pupil is relatively small, and consequently easy to aberrationaly correct for, correction must be performed considering potential vergence errors. Thus, for an aberration such as spherical aberration, a monotonic error may have a greater magnitude than one that wanders about the paraxial focus and still produce better overall correction.

A first embodiment 400 of an optical system uses a mirror, a notch beam-splitter, a non-conformal concave mirror and a source as illustrated in FIG. 4. A transmission, notch beam-splitter is also used in conjunction with a reflection notch collimating mirror.

Visible light 402 enters the optical system 400, from the outside world, passing through a non-conformal notch collimating element 404 substantially passing all the visible light except for a small wavelength portion which is reflected back to the outside. The light passing through the non-conformal notch collimating element 404 encounters a mirror 406 and is reflected towards an interference notch beam-splitter 408. The visible light incident on the interference notch beam-splitter 408 is substantially reflected towards and viewed by a viewer's eye 410.

Light travels from a source 412 through an optic 414 and is incident on the interference notch beam-splitter 408. A portion of the source light 412 is reflected by the interference notch beam-splitter 408 and a portion of the light is transmitted by interference notch beam-splitter 408. The transmitted portion of the source light 412 travels towards and is incident upon the mirror 406. The source light is reflected by the mirror 406 towards the non-conformal notch collimating element 404. The source light is incident on the non-conformal notch collimating element 404 and is reflected towards the mirror 406. The source light is reflected by the mirror 406 towards the interference notch beam-splitter 408 and is incident on the interference notch beam-splitter 408. A first portion of the source light is transmitted by the interference notch beam-splitter 408. A second portion of the source light is reflected by the interference notch beam-splitter 408 towards and is viewed by the eye 410.

FIG. 5 illustrates another embodiment of an optical system having a mirror, a beam-splitter consisting of a wide band metallic coating combined with a trans-reflective polarizer, a non-conformal concave mirror, and a non-polarized source and a narrow wavelength source.

Outside light 502 enters the optical system 500, from the outside world, passing through a notch reflector 504 which is a non-conformal notch collimating mirror. The non-conformal notch collimating mirror 504 substantially passes all the visible light except for a small wavelength portion which is reflected back to the outside of the optical system 500. The light then passes through a ¼ wave plate 506. The outside light passing through the ¼ wave plate 506 encounters a mirror 508 and is reflected towards a trans-reflective polarizer 510. A first portion of the outside light is reflected by the trans-reflective polarizer 510 towards and is viewed by the eye 512. The remainder of the outside light passes through the trans-reflective polarizer 510 and is incident on a beam-splitter 514. The used portion of the light is reflected by the beam-splitter 514 and passes through the trans-reflective polarizer 510. The light then travels to and is observed by the eye 512.

A limited spectral width of light leaves the source 516 and is polarized by a linear polarizer 518 and becomes plane polarized. The plane polarized light passes through a field lens or corrector element 520. The plane polarized light is incident on the beam-splitter 514 and a used portion passes through. The plane polarized light is incident on the trans-reflective polarizer 510. The transmission axis of the trans-reflective polarizer 510 is oriented to pass the plane polarized light. The plane polarized light continues to the mirror 508 which reflects the plane polarized light towards the ¼ wave retarder 506. The light then passes through the ¼ wave retarder 506 becoming circularly polarized and continues to the non-conformal notch collimating mirror 504 which reflects the light back to the ¼ wave retarder 506. The ¼ wave retarder 506 converts the circularly polarized light to plane polarized light. The plane polarized light continues to the mirror 508 which reflects the plane polarized light towards the trans-reflective polarizer 510. The plane polarized light is reflected by the trans-reflective polarizer 510 and is observed by the eye 512.

Another embodiment 600 of an optical system has a mirror, a beam-splitter notch interference beam splitter combined with a trans-reflective polarizer, a non-conformal concave mirror, a polarized source and a narrow wavelength source.

This embodiment 600 as illustrated in FIG. 6 illustrates an outside light 602 from the outside that enters the system through a first window 604. The first window 604 may contain an inorganic optical substance or support a dye layer 606, which absorbs a narrow wavelength range or ranges of light. A reflective holographic element 608 is constructed with a holographic reflectance peak or peaks that match the absorptive peak or peaks of the first glass window 604 or a dye layer 606 or both 604 and 606. The remaining light then passes through a reflective holographic element 608. The outside light 602 then passes through a quarter wave plate 610. The outside light then enters a transparent medium 612. The outside light 602 is incident upon a reflective surface 614 and is, directed towards a trans-reflective polarizer 616 which reflects a first portion of incident non-polarized outside light through a second window 618. The outside light 602 is directed towards the eye 620. The trans-reflective polarizer 616 transmits a second portion of the light which is then incident on a filter 622. The notch interference beam splitter 622 is constructed of a dielectric multi-layer coating which passes a narrow wavelength band or bands of light, corresponding with the reflection peak or peaks of the reflective holographic element 608, and reflects other wavelengths. The outside light incident on the notch interference beam splitter 622 is substantially reflected through the trans-reflective polarizer 616 and the second window 618 towards the eye 620.

Linearly polarized light, of a narrow wavelength notch or wave length notches, exits an image plane 624 and passes through a field lens which could be a diffractive optical element or a geometric optic 626 which corrects aberrations associated with the optical field. The image plane light then enters a prism 628 and is incident on a notch interference beam splitter 622 which passes substantially all the image plane incident light by transmitting the narrow wavelength(s) notch. The image plane light then encounters the trans-reflective polarizer 616 which is oriented to pass the entire linearly polarized image plane light of the direction leaving the image plane 624. The light then enters the transparent medium 612 and continues to the reflective surface 614 which directs the linearly polarized light towards the quarter wave plate 610. The linearly polarized image plane light then passes through the quarter wave 610 a first time becoming circularly polarized light which is then incident on the reflective holographic element 608. The reflective holographic element 608 substantially collimates the light which is then reflected towards the quarter wave plate 610 passing through the quarter wave plate 610 a second time in the reverse direction which restores the circularly polarized light to linearly polarized light with a polarization axis rotation of ninety degrees with regard to the to the linearly polarized light before entering the quarter wave plate 610 the first time. The light enters the transparent medium 612 and is incident on the reflective surface 614 which directs the light towards the trans-reflective polarizer 616. The trans-reflective polarizer 616 reflects substantially all the linearly polarized light towards the second window 618. The light exits the second window 618 and is viewed by the eye 620.

In such a see-through optical system there are number of variations that may evolve from the embodiments described above. A first variation is that the source described in the embodiments may include an LCD; OLED; Plasma screen; CRT; or a Projector and a screen.

The beam-splitter used may be a notch beam splitter, a dielectric notch transmitter combined with a trans-reflective polarizer, or a broad band beam splitter combined with a trans-reflective polarizer. The non-conformal concave mirror described in the embodiments may be a holographic element a Fresnel surface or kiniform.

The optical systems described above may be used with a combination of wave plates to rotate the plane of polarization thereby increasing the virtual image throughput. Additionally the optical, systems described may be used with a combination of cholestreic liquid crystal surfaces dependent on the direction of elliptically polarized light thereby increasing the virtual image throughput. Furthermore the optical systems described above may have absorbing filters to suppress the reflection of wavelengths which may be reflected by elements in the system to the outside world. The optical systems described may use lenses other then the non-conformal concave mirror to correct aberrations. The input device in the various optical systems may be any input device that is an image plane or that forms an image plane. These include an LCD; OLED: Plasma screen; CRT; Projector and a screen.

Each of these embodiments use a method of optical design wherein certain portions or elements of the optical system are used for multiple purposes and/or transmit certain paths of light transmission in multiple directions. This use of multiple purposes and multiple paths produces embodiments of the invention that are smaller and more robust.

Although the present invention has been described in considerable detail with reference certain preferred embodiments thereof, other versions are possible. Therefore, the spirit and scope of the appended claims should not be limited to the description of the preferred versions contained herein.

I claim:

1. A see through optical system comprising:
a fold mirror and a beam-splitter to view an outside world;
said beam-splitter introduces an image collimated by a non-conformal concave mirror forming a collimated virtual image; and
wherein both an outside light and said collimated virtual image can be observed by an observer's eye simultaneously;
wherein said collimating element passes a majority of visible light and reflects a small wavelength;
a remaining portion of said visible light encounters said fold mirror;
said fold mirror reflects said remaining portion of said visible light towards an interference notch beam splitter wherein said remaining portion of said visible light is reflected towards and is observed by said observer's eye;
a light source emits a source light through a field lens and said source light is incident upon said interference notch filter;
a first portion of said source light is reflected by said interference notch filter;
a second portion of said source light is transmitted by said interference notch filter toward said mirror;
said transmitted portion of said source light is reflected by said fold mirror towards said non-conformal notch collimating element;
said transmitted portion of said source light is reflected by said non-conformal notch collimating towards said fold mirror and is incident upon said interference notch beam-splitter;
a first portion of said transmitted portion of said source light is transmitted by said interference notch beam-splitter;
a second portion of said transmitted portion of said source light is reflected towards and is observed by said observer's eye.

2. The optical system of claim 1 wherein said observer's eye observes a combination of substantially all said visible light entering said system and said source light generated by said source.

3. The optical system of claim 1 wherein said non-conformal notch collimating element further comprises a holographic element, a Fresnel surface or a kiniform.

4. The optical system of claim 1 wherein said interference notch beam splitter further comprises a notch beam splitter, a dielectric notch transmitter combined with a trans-reflective polarizer.

5. The optical system of claim 1 wherein said optical system further comprise:
a combination of wave plates to rotate the plane of polarization thereby increasing the virtual image throughput;
a combination of cholesteric liquid crystal surfaces dependent on the direction of elliptically polarized light thereby increasing the virtual image throughput;
one or more absorbing filters to suppress a reflection of wavelengths which are reflected by elements in said system to said outside world; and/or
lenses other than said non-conformal concave mirror to correct aberrations.

6. The optical system of claim 1 wherein said light source are any input device that is an image plane or that forms an image plane including: an LCD; OLED; plasma screen; CRT or a projector and a screen.

7. The optical system of claim 1 wherein said interference notch beam splitter further comprises a broad band beam splitter with a trans-reflective polarizer.

8. A see-through optical system comprising:
a fold mirror and beam-splitter to form a rhomboid prism with said rhomboid prism allowing a first view of an outside world; and
said beam-splitter enables a virtual image within said rhomboid prism, wherein a light beam forming said virtual image is collimated by a non-conformal concave mirror;
said non-conformal mirror substantially passes all outside light except a small wavelength portion which is reflected back to the outside world;
said substantially all outside light portion passes through a ¼ wave plate and encounters a mirror wherein said substantially all outside light is reflected towards a trans-reflective polarizer;
a first portion of said substantially all outside light portion is reflected by said trans-reflective polarizer towards and is observed by an observer's eye;
a second portion of said substantially all outside light portion is passed through said trans-reflective polarizer and is incident on said beam splitter;
a first portion of said second portion of said substantially all outside light portion is reflected by said beam splitter and passes through said trans-reflective polarizer and travels to and is observed by said observer's eye;
a source emitting a limited spectral width of a source light;
said source light is polarized by a linear polarizer, becoming plane polarized;
said first plane polarized source light passes through a field lens and is incident upon said beam-splitter and a used portion of said first plane polarized source light passes through said beam-splitter;
said passed first plane polarized source light is incident upon said trans-reflective polarizer;
a transmission axis of said trans-reflective polarizer is oriented to pass said first plane polarized source light;
said first plane polarized source light is passed to said mirror which reflects said plane polarized light towards and passes through said ¼ wave retarder becoming circularly polarized source light;
said circularly polarized source light reflects off said non-conformal notch collimating mirror;
said reflected circularly polarized source light is reflected towards said ¼ wave retarder wherein said circularly polarized source light is converted to a second plane polarized source light as a result of passing through said ¼ wave retarder;
said second plane polarized source light is passed to said mirror;
said second plane polarized source light is reflected by said mirror towards said trans-reflective polarizer wherein said second plane source light is reflected towards and is observed by said observer's eye, wherein said system provides both outside and source to the observer's eye.

9. The optical system of claim 8 wherein said non-conformal notch collimating element further comprises a holographic element, a Fresnel surface or a kiniform.

10. The optical system of claim 8 wherein said interference notch beam splitter further comprises a notch beam splitter, a dielectric notch transmitter combined with a trans-reflective polarizer.

11. The optical system of claim 8 wherein said optical system further comprises:
   a combination of wave plates to rotate the plane of polarization thereby increasing the virtual image throughput;
   a combination of cholesteric liquid crystal surfaces dependent on the direction of elliptically polarized light thereby increasing the virtual image throughput;
   one or more absorbing filters to suppress the reflection of wavelengths which may be reflected by elements in the system to the outside world; and/or
   lenses other than the non-conformal concave mirror to correct aberrations.

12. The optical system of claim 8 wherein said light source are any input device that is an image plane or that forms an image plane including: an LCD; OLED; plasma screen; CRT; or a projector and a screen.

13. The optical system of claim 8 wherein said interference notch beam splitter further comprises a broad band beam splitter with a trans-reflective polarizer.

14. An optical system comprising:
   a fold mirror;
   a beam-splitter;
   a non-conformal concave mirror; and
   an image source wherein said mirror and said beam-splitter form a rhomboid reflector;
   further wherein said rhomboid reflector is used to view the outside world and wherein said beam-splitter allows the introduction of light from said image source into said rhomboid prism where within said rhomboid prism said non-conformal concave mirror collimates light from said image source to become a collimated image source making both the said outside world and said collimated image source visible to eye(s)
   a first window through which outside light passes, wherein said first window absorbs one or more narrow wavelength ranges of outside light;
   a reflective holographic element having one more holographic peak that match said one or more absorbent narrow wavelength ranges of said window;
   a remaining portion of said outside light passes through said reflective holographic element and passes through a ¼ wave plate;
   said remaining portion of outside light passes through a transparent medium and is reflected by a reflective surface and is directed towards a trans-reflective polarizer;
   said trans-reflective polarizer reflects a first portion of said non-polarized remaining portion of outside light through a second window and towards and observer's eye;
   a second portion of said non-polarized remaining portion of outside light which become incident on a filter that passes said holographic peaks and reflects remaining portion of outside light through said trans-reflective polarizer and said second window to be observed by an observer's eye;
   an image plane that emits a first linearly polarized light within said one or more narrow wavelength ranges and passes through a prism;
   said image plane light then enters a beam splitter and incident on said filter;
   said filter passes substantially all said image plane light by transmitting said one or more wavelength ranges;
   said image plane light encounters said trans-reflective polarizer and passes an entire first linearly polarized image plane light;
   said image plane light enters said transparent medium and continues towards said reflective surface which directs said first linearly polarized image plane light to and through said ¼ wave plate wherein said first linearly polarized image plane light becomes circularly polarized light;
   said circularly polarized image plane light is incident upon said holographic element which substantially collimates said circularly polarized image plane light and reflects said circularly polarized image plane light towards and back through said ¼ wave plate wherein said circularly polarized image plane light becomes a second linearly polarized image plane light with a polarization axis rotation of ninety degrees relative to said first linearly polarized image plane light;
   said second linearly polarized image plane light enters said transparent medium and is said reflective surface said second linearly polarized image plane light towards said trans-reflective polarizer; and
   substantially all, of said second linearly polarized image plane light is reflected by trans-reflective polarizer towards and through said second window to said observer's eye.

15. The system of claim 14 wherein said first window comprises an inorganic substance which absorbs said one or more narrow wavelength range or ranges of light.

16. The system of claim 14 wherein said non-conformal notch collimating element further comprises a holographic element, a Fresnel surface or a kiniform.

17. The optical system of claim 14 wherein said interference notch beam splitter further comprises a notch beam splitter, a dielectric notch transmitter combined with a trans-reflective polarizer.

18. The optical system of claim 17 wherein said optical system further comprises:
   a combination of wave plates to rotate the plane of polarization thereby increasing the virtual image throughput;
   a combination of cholesteric liquid crystal surfaces dependent on the direction of elliptically polarized light thereby increasing the virtual image throughput;
   one or more absorbing filters to suppress the reflection of wavelengths which are reflected by elements in said system to said outside world; and/or
   lenses other than non-conformal concave mirror to correct aberrations.

19. The optical system of claim 14 wherein said light source are any input device that is an image plane or that forms an image plane including: an LCD; OILED; plasma screen; CRT; or a projector and a screen.

20. The optical system of claim 14 wherein said interference notch beam splitter further comprises a broad band beam splitter with a trans-reflective polarizer.

* * * * *